Sept. 26, 1967  A. G. DEAN ETAL  3,343,830
SPRING APPARATUS FOR RAILWAY CARS
Filed Jan. 18, 1966
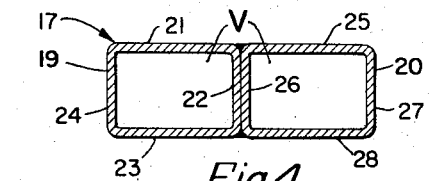
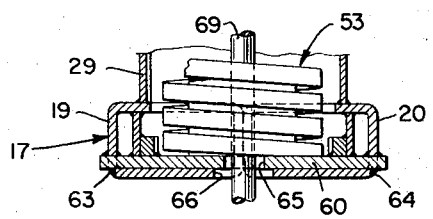
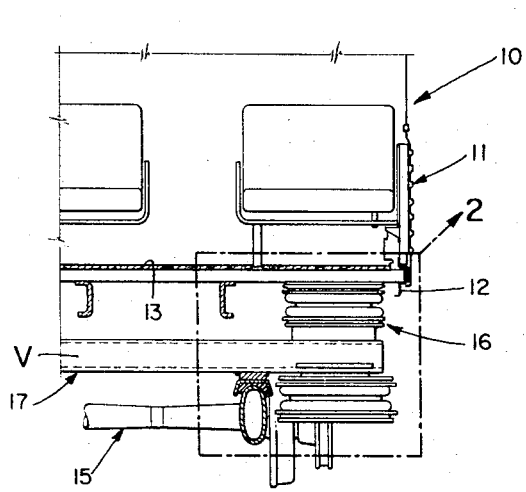
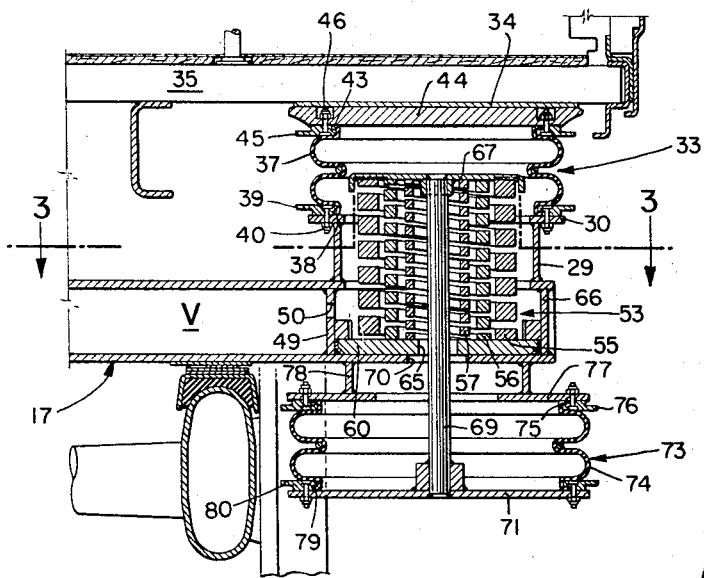
INVENTORS
ALBERT G. DEAN
GEORGE W. ELSE
BY
William R. Nolte
AGENT

United States Patent Office 3,343,830
Patented Sept. 26, 1967

3,343,830
SPRING APPARATUS FOR RAILWAY CARS
Albert G. Dean, Narberth, and George W. Else, Warminster, Pa., assignors to The Budd Company, Philadelphia, Pa., a corporation of Pennsylvania
Filed Jan. 18, 1966, Ser. No. 521,296
6 Claims. (Cl. 267—34)

The present invention relates to a pneumatic spring apparatus for railway cars, and more particularly, to a pneumatic spring apparatus employing supplemental coil springs for use in railway cars.

Pneumatic spring systems heretofore employed in the prior art have included primary resilient air bellows devices cooperating with supplemental mechanical coil springs which together operate to maintain a car body at a predetermined level above a truck assembly. The air bellows in such systems are in communication with an air tank or reservoir adequately supplied with a suitable source of pressure, controlled as to demand and requirements. The supplemental mechanical steel coil springs have usually been placed in a side by side assisting relationship relative to the air bellows. When so arranged the air spring bellows and the mechanical springs deflect in unison and each operate to assume a predetermined share in supporting the vertical loads of the car. This has been disadvantageous, for aside from posing cost and space penalties, the use of the mechanical coil springs have precluded the full benefits of riding on air alone.

A further problem of such arrangements is related to the permissable excursion or change in level of the car body from its empty condition to its fully loaded condition. The limit of such excursion is usually fixed by interstate commerce regulations and is in most instances limited to two inches of travel. Thus an empty car would stand two inches higher than a fully loaded car and the coupling apparatus usually employed would accept cars varying within such limits. With a car employing both air suspension and steel springs and in the event of a malfunction of its air bellows or air supply, the mechanical steel springs in such prior art designs would permit the car body to sag or drop below such limits, thereby precluding coupling of such a car by the aforementioned coupling apparatus. Accordingly, it is the principal object of this invention to provide supplemental spring apparatus combined with primary air spring suspension apparatus which avoids one or more of the disadvantages of the prior art, and which has improved efficiency.

It is another principal object of this invention to provide an improved primary air spring suspension apparatus for a railway car utilizing supplemental mechanical spring apparatus wherein in the event of a malfunction or collapse of the air suspension system, the supplemental spring system will retain the proper level of the car body.

For a better understanding of the present invention, together with other and further objects thereof, reference is had to the following description taken in connection with the accompanying drawing and its scope will be pointed out in the appended claims.

In accordance with the invention pneumatic air spring means may be mounted upon truck structure of a railway car in a manner to independently support a car body at a proper level above the truck in either an empty or a fully loaded condition of the car body. The invention further contemplates the use of supplemental mechanical spring means mounted relative to the air spring means in a manner as to not interfere with its normal operation. Movable means responsive to changes in pressure in the air spring means are connected to the supplemental mechanical spring means to precompress the same during normal operation of said air suspension means and upon malfunction due to collapse or loss of air in said air suspension means, said supplemental mechanical spring means is effective to support the body of the railway car at its proper car body height.

In the drawings FIG. 1 is a partial vertical sectional view taken transversely of the railway car and showing the same supported on a truck by the spring suspension means embodying the present invention;

FIG. 2 shows the enclosed area designated A of FIG. 1, greatly enlarged;

FIG. 3 is a view partially in section taken along the line 3—3 of FIG. 2;

FIG. 4 is a sectional view taken along the line 4—4 of FIG. 5; and

FIG. 5 is a sectional view taken along the line 5—5 of FIG. 3.

As shown in the drawings a preferred embodiment of the invention is shown incorporated for use in a railway car 10. The railway car includes a body 11, having side sills 12, a floor 13, and a truck assembly 15. The improved pneumatic spring apparatus 16 of the present invention is shown supporting the car body 11 upon the transverse truck bolster 17 of the truck assembly. The truck assembly may be of well known construction having independently movable side frames connected with wheel-axle units shown and illustrated in U.S. Patent 2,908,230 to W. B. Dean entitled "Railway Car Truck," dated October 13, 1959 and assigned to the same assignee as the present invention.

With reference to FIGS. 2, 3 and 5, the truck bolster 17 is shown as being formed of two rectangular tubes 19 and 20 suitably welded together and in the present instance constituting a suitable reservoir V containing a supply of air under pressure. Tube 19 includes a top wall 21, inner side wall 22, a bottom wall 23 and an outer wall 24. Rectangular tube 20 likewise includes a top wall 25, inner side wall 26, outer side wall 27 and bottom wall 28. The tubes 19 and 20 may be suitably joined as by welding along the inner face of side walls 22 and 26 respectively to form an integral load carrying member.

With reference to FIG. 2 and FIG. 3 it is observed that the outer end of the bolster 17 carries on its top faces 21 and 23, a circular upstanding plate support 29 having a top horizontal flange 30, and supports thereabove primary air spring means 33. The air spring means coacts at its upper end with a plate 34 which in turn engages the lower frame structure 35 of the car body to support the same at predetermined proper levels above the bolster 17 of the truck assembly in response to variations in passenger loading and in response to the magnitude of the pressure from the reservoir V. The air spring means 33 normally constitutes the sole spring means for supporting the car body 11 with full passenger load at the proper level above the bolster 19.

The air spring means 19 may be of conventional air bellows construction and includes a resilient cylindrical bellows type member 37 of suitable material with an enlarged lower edge 38 which is clamped to the aforementioned horizontal extending flange 30 by means of a clamping ring 39 and suitable bolts 40. The upper edge of the elastic bellows member 33 likewise includes an enlarged edge 43 which abuts a cap plate 44 and is clamped thereto by means of a similar ring 45 and secured in place by bolts 46.

As further seen in FIG. 2 the top surface portions of rectangular tubes 19 and 20 of the bolster 17 includes a circular aperture or opening 47. This opening is of a slightly smaller size than the diameter of the bellows member 37. In addition portions of the upstanding inner walls 22 and 26 have been cut away so as to be flush with the bottom walls 23, 28 over an extent corresponding to the diameter of the bellows member 37. The openings in the tubes 19 and 20 are then provided with a vertical plate 49 adjacent the inboard portion of the bellows. The upright plate 49 is however, provided with apertures 50 which permit limited flow of air under pressure or other suitable medium to the primary air spring means 33.

It has been found desirable to provide supplemental spring means 53 provided with sufficient capacity to support the car body with a full passenger load at the proper level in the event of a malfunction of the aforementioned primary spring means 33. It has been further found desirable that the supplemental spring means 53 be effective to retain the proper level of the car body 11 above the bolster 17 without any contribution or independently or from the primary pneumatic air spring means 33. For this purpose a plurality of coaxial arranged coil springs 55, 56 and 57 are cylindrically arranged one with respect to another and mounted with their lower ends upon a rectangular plate 60, resting on the lower wall surfaces of the bolster 17.

With reference to FIG. 4, in addition to the inner side walls 22 and 26 of rectangular tubes 19 and 20 having been cut away, the outer side walls 24 and 27 of the tubes are slotted as at 63 and 64 respectively to permit the plate 60 to be inserted so as to rest upon the upper surfaces of the horizontal lower wall portions 23 and 28 of the rectangular tubes. The aforementioned plate 60 centrally apertured as at 65 serves to reinforce the aforementioned bolster construction. The outermost ends of the tubes 19, 20 are then closed by means of end plate 66 suitably secured as by welding.

During normal operation of the pneumatic air spring 33 supplemental coil spring means 53 are precompressed sufficiently so as not to interfere with the normal operation thereof. This precompression is accomplished in the present form of the invention by a top cap plate 67 which encompasses and coacts with upper ends of the forementioned coil springs 55, 56 and 57, nested one within another and aligned axially within and along the axis of the primary air spring 33. Rod 69, suitably affixed to plate 67 extends downwardly from the lower surface of the plate and axially of said springs through the aforementioned aperture 65 within plate 60 and additionally through aperture 70 in the lower walls 23 and 28 of tubes 19 and 20 and beyond the lower surface thereof to terminate in an affixed relationship with a circular bottom plate 71 of auxiliary air spring means 73. The latter auxiliary air spring means is shown located on the bottom of the bolster 17 and in the present form of the invention, includes a flexible cylindrical bellows member 74 of resilient material. It includes an enlarged upper bead ring 75 which by means of clamping ring 76 is secured to horizontally disposed plate 77, the latter plate being affixed to lower base ring 78. In a similar manner the bottom enlarged bead ring 79 of the resilient bellows member is clamped to the forementioned circular plate 71 by means of clamping ring 80.

It is observed that by virtue of the aforementioned apertures 50 in upstanding plate 49 at the end openings of the rectangular bolster tubes 19 and 20, and by means of aperture 65 in reinforcing plate 60, and by means of aperture 66 in the bottom walls 23, 28 of said tube members, the upper primary air spring means 33 is in communication with the auxiliary spring means 73 beneath the bolster. It is further observed that the helical spring means 53 are precompressed and retained in a precompressed state as long as a suitable source of air pressure is supplied to the primary air spring 33. However, deflation of the main air spring 33 by virtue of its cooperation with auxiliary air spring 73 automatically results in the deflation of the auxiliary air spring means and thereby releases the axle thrust of rod 69 applied to the top cap plate 67 to release the mechanical supplemental springs for coaction with the underside of the car body.

It is noted further that in the present form of the invention the volume of auxiliary air spring 73 is greater than that of the primary air spring 33. This follows in that mechanical spring 53 is of a constant such that it will handle the vertical loads imposed on it by the car body in the same manner as the primary spring 33. When mechanical spring 53 is released it must support the car body at substantially the same elevation as the primary air spring 33 if the latter were carrying the vertical body loads. Upon loss of air or collapse of bellows 30 and 74, mechanical spring 53 will start to come up as soon as pressure on the air springs starts to drop off. Thus the lower auxiliary bellows must be equivalent in volume or capacity to that of primary bellows, 33, plus an additional capacity sufficient to compress mechanical spring 55 a desired amount for clearance.

While there has been described what at present is considered to be the preferred embodiment of this invention, it will be obvious to those skilled in the art that various changes and modifications may be made therein without departing from the scope of the invention, and it is therefore aimed in the appended claims to cover all such changes and modifications as fall within the true spirit and scope of the invention.

What is claimed is:

1. Pneumatic apparatus for a car body, and truck assembly including a bolster, the combination comprising: air spring means mounted on the bolster of said truck assembly and coacting with said car body to support the same at predetermined proper levels above the bolster in response to variations in pressure within said air spring means, supplemental spring means mounted on said bolster and adapted to coact with said car body, said last named spring means being capable of independently supporting said car body at said predetermined proper levels above the bolster upon loss of pressure in said air spring means, movable means connected to said supplemental spring means and responsive to changes in pressure within said air spring means, said movable means in one position thereof and in response to a given state of pressure being operative to precompress said supplemental spring means out of contact with said car body so that said air spring means solely supports the vertical loads of said car body, and in another position thereof corresponding to a different state of pressure within said primary air spring being operative to enable said supplemental spring means to coact with said car body to support the vertical loads of the car body in lieu of said air spring means.

2. In the pneumatic apparatus as set forth in claim 1, wherein said supplemental spring means includes a coil spring, and is nested within and aligned axially relative to said air spring means.

3. In the pneumatic apparatus as set forth in claim 1, wherein said supplemental spring means includes a plurality of coil springs concentrically arranged and nested within and axially aligned relative to said air spring means.

4. In the pneumatic apparatus set forth in claim 2 wherein said movable means includes means in engagement with one end of said supplemental spring means, and auxiliary pneumatic spring means in pressure sensing engagement with said air spring means and in force applying relationship with said supplemental spring engaging means to precompress said spring means in response to said given state of pressure within said air spring means and upon collapse of pressure therein to enable movement of said supplemental spring means to engagement with said car body.

5. In the pneumatic apparatus set forth in claim 4 wherein said auxiliary spring means is coaxially aligned with said air spring means and is disposed on the bolster on the side opposite that of said air spring means.

6. In the pneumatic apparatus set forth in claim 5 wherein said auxiliary pneumatic spring means is capable of exerting a force on said supplemental spring engaging means which is in excess of the vertical load to which the air spring means are subjected.

No references cited.

ARTHUR L. LA POINT, *Primary Examiner.*

R. M. WOHLFARTH, *Assistant Examiner.*